United States Patent [19]
Storey

[11] 3,766,757
[45] Oct. 23, 1973

[54] SECURING DEVICE FOR TWO-WHEELED VEHICLES

[75] Inventor: James S. Storey, Palo Alto, Calif.

[73] Assignee: Phill Berger, Carmel Valley, Calif., a part interest

[22] Filed: Oct. 24, 1972

[21] Appl. No.: 300,099

[52] U.S. Cl. .................................................. 70/18
[51] Int. Cl. ............................................ E05b 73/00
[58] Field of Search ..................... 70/14, 15, 18, 57, 70/58, 227, 233, 234, 236

[56] References Cited
UNITED STATES PATENTS
1,440,278  12/1922  Chockol................................ 70/227

FOREIGN PATENTS OR APPLICATIONS
151,494   9/1920  Great Britain......................... 70/227
872,347   2/1942  France.................................. 70/227
576,355   3/1946  Great Britain......................... 70/236

Primary Examiner—Robert L. Wolfe
Attorney—Sol L. Goldstein

[57] ABSTRACT

A locking device for bicycles formed of hardened steel rod and shaped so as to engage the two wheels at the sections of the rims of the wheels which are closest to one another and which also encircles the sprocket drive mechanism. The free ends of the elongated, generally rectangularly shaped shackle have integrally formed loops or hasps so that the shackle can be locked with a padlock. The hasps are welded closed so that they cannot easily be opened with a pry-bar to free up the lock. When not in use to secure the wheels to the frame the shackle can be conveniently stored under the seat through the use of suitable clips mounted on the cross bar or along the rear fork or fender.

8 Claims, 8 Drawing Figures

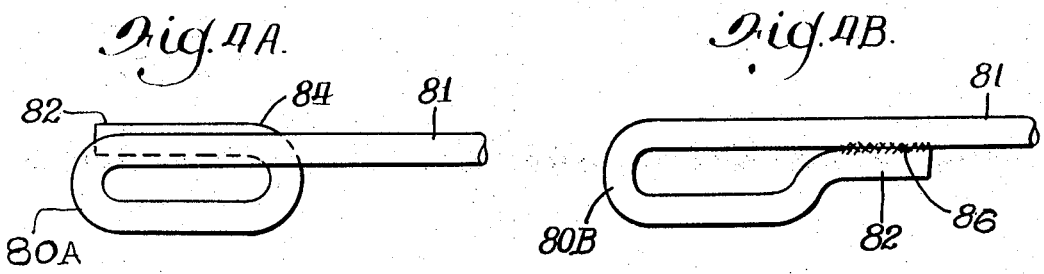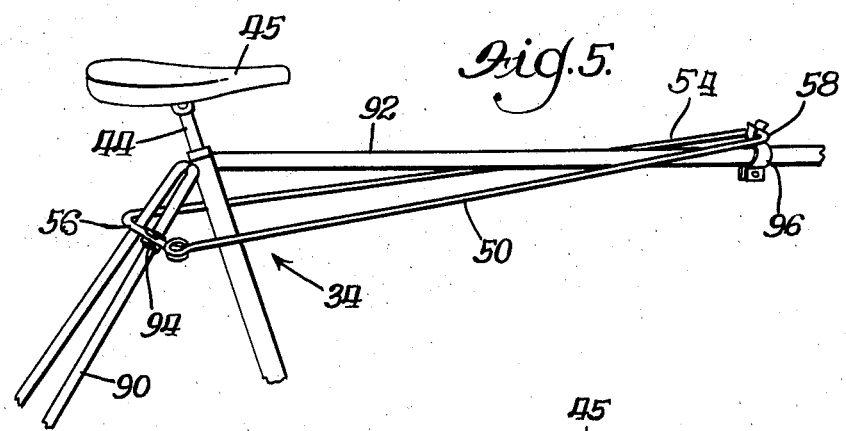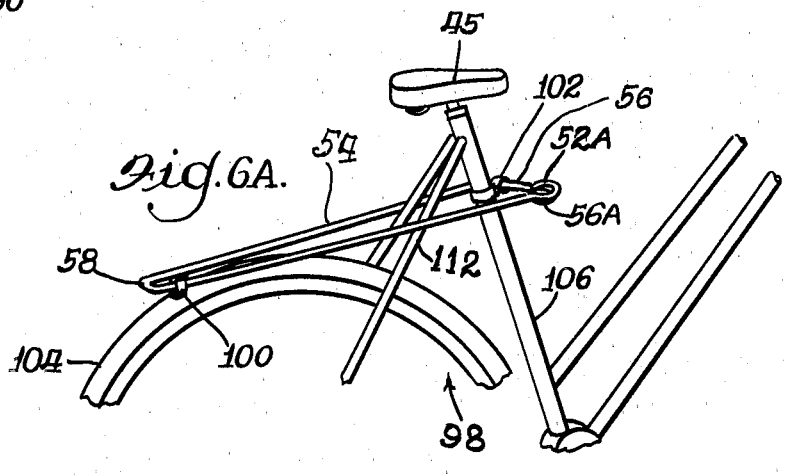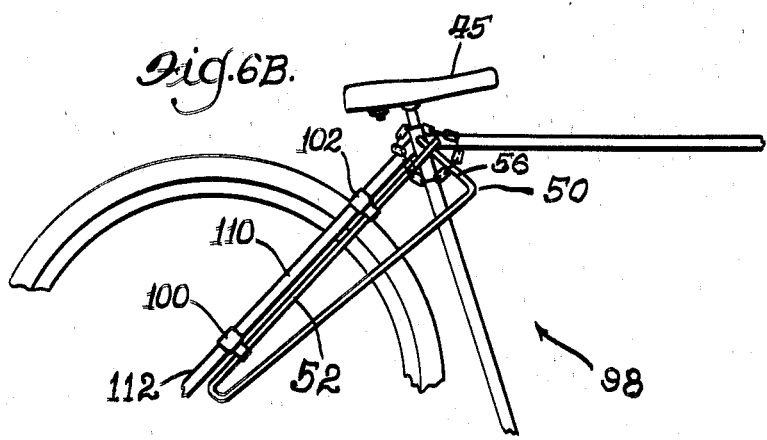

SECURING DEVICE FOR TWO-WHEELED VEHICLES

BACKGROUND OF THE INVENTION

This invention relates generally to locking devices for two-wheeled vehicles and, more particularly, to locking devices for bicycles having an improved unitary construction which secures the wheels to the frame structure.

Heretofore, construction of such devices were deficient because they could readily be opened through the use of pry-bars. Such constructions as disclosed in U.S. Pat. Nos. 584,017 and 1,443,009 were not fully protective against being forced open through the use of various portable prying devices.

One of the most common security devices employed is a length of chain which is adapted to engage the portions of the bicycle to be protected. In order to encircle the wheels and also engage the fixture to which the bicycle is secured, a length of chain is required which is at least four feet in length and probably in the range of 5 to 6 feet. Understandably, the size and weight of such a locking arrangement makes their use, at the very least one of great inconvenience and certainly most cumbersome when it comes to storing the securing unit or chain on the vehicle when the chain is not in use. For example, it is common to secure such length of chain in the upper section of the vehicle under the seat, which is somewhat cumbersome, inconvenient, and interferes with the normal use of the bicycle.

Other known constructions, while capable of engaging the wheels of the bicycle, did not effectively protect against defeat of the securing arrangements through the use of pry-bars and similar devices which could be used to pry open the closures or hasps which received the padlocks. Still other constructions do not lend themselves to being stored conveniently, directly on the vehicle when it is not in use, and which would interfere or otherwise detract from the maximum enjoyment of the vehicle during operation.

It is the general object of this invention to provide an improved security device for securing two wheeled vehicles in a manner that is effective in defeating the theft on the vehicle or any portion thereof and is also convenient to use and to store when operating the vehicle.

It is another object of this invention to provide an improved security device for securing two-wheeled vehicles, which is simple in construction, inexpensive to manufacture, and effectively prevents theft of the entire vehicle or portions thereof.

It is a specific object of this invention to provide an improved locking device that secures the vehicle by encircling the wheels thereof, including the frame, and which is further equipped with pry-proof lock receiving hasps.

It is a further specific object of this invention to provide an approved locking device that can be readily placed in position on the lower portion of the vehicle for locking said vehicle when not in use and for conveniently storing the locking device on the upper section of the vehicle, under the seat, when the vehicle is placed in operation.

SUMMARY OF THE INVENTION

The above and other objects and advantages of the present invention are realized in the construction of the shackle device which is formed of a resilient metal rod, formed into a U shaped shackle, having two leg portions extending from a common base and terminating in a closure equipped with matingly engaging hasps.

The length of the shackle is such as to conform to the distance extending between the inside rims of the front and rear wheels of the bicyle and also to include therebetween the sprocket or drive mechanism.

The hasps or closure constructions are such that they matingly engage with one another so as to conceal and otherwise render inaccessible the free ends of the shackle, so as to prevent the use of a pry-bar from separating the closures from the main leg portions of the shackle.

Several embodiments are described to provide the suitable inaccessibility of the closure to a pry-bar or other instrument which might be used to spread apart the closure, amongst which there is included overlapping arrangements as well as welding the closure.

The combination of this invention also provides a suitable storage place for the shackle when it is not in use on the bicycle, in an out of the way location underneath the seat of the rider of the bicycle providing a secure location and one which does not interfere with the operation of the vehicle.

BREIF DESCRIPTION OF THE DRAWINGS:

The invention, together with the above and other objects and advantages thereof, will best be understood from the following detailed description together with the accompanying drawings in which:

FIG. 1. Is a perspective view of the vehicle showing the shackle device in its operating or securing position on the vehicle;

FIG. 2. Is a cross section of the vehicle in FIG. 1 taken along lines 2 — 2 of FIG. 1;

FIG. 3. Is an enlarged detail of the shackle showing another embodiment of the hasp construction;

FIG. 4A. Is an enlarged detail of another embodiment showing a technique of forming the hasp closure of the instant invention;

FIG. 4B. Is an enlarged detail showing still another embodiment of forming the hasp;

FIG. 5. Is a fragmentary view showing the shackle device in its stored condition on the upper frame portion of the vehicle;

FIG. 6A. Is a fragmentary view showing the shackle in the stored condition on the upper frame portion of the vehicle;

FIG. 6B. Is a fragmentary view of another embodiment of the vehicle shown in 6A with the shackle stored on the upper portion of the frame under the driver seat.

DESCRIPTION OF THE PREFERRED EMBODIMENTS

Figure 1:
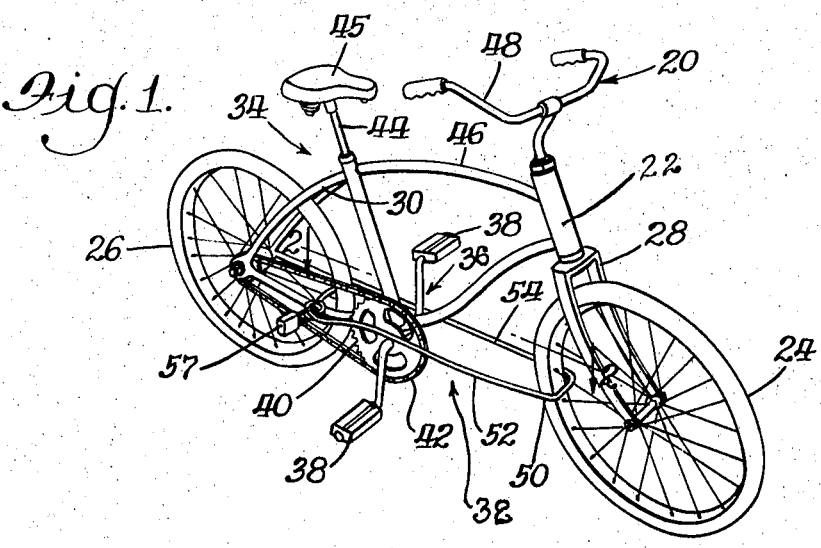

Referring now to the drawings, there is shown in FIG. 1, a conventional two-wheeled bicycle identified generally with the numeral 20, having a frame 22 and pair of wheels 24 and 26 which are rotatably received in a front fork 28 and rear fork 30, respectively.

The bicycle frame 22 is comprised of a lower portion identified generally as 32, and an upper portion identified as 34.

The lower frame portion 32 consists of a drive mechanism 36 which includes the pedals 38, a sprocket 40 and drive chain 42.

The upper frame portion 34 consists of the seating structure 44, the cross bar 46 and handle bars 48.

On the lower frame 32 there is shown in position the shackle device of the instant invention identified with the numeral 50 engaging the wheels 24 and 26 and encircling the driving mechanism 36. The shackle 50 is formed of a heavy gauge metal rod having a generally U shaped configuration, including a pair of leg portions 52 and 54. The material construction can be a variety of ferrous materials but preferably a case hardened steel is used in which the leg portions have a circular cross-section. The use of a case hardened steel renders the device resistant to tampering with the pry-bar or heavy duty chain cutter and further provides a certain amount of resiliency so that the shackle will be biased to the open position.

The shape and formation of the matingly engaged hasp portions are important aspects of the construction of the shackle device of this invention, as will be discussed in greater detail hereinafter. It will be understood that the specific dimensions of the shackle will depend on the type and size of the vehicle with which it will be used. Generally, the overall length of the shackle, for an ordinary 26 inches diameter wheeled bicycle, is 18 inches, having a 3 inches width at its widest or closure end and a 1½ inches length at the base portion of the U. The diameter of the cross section of the legs may range anywhere from ¼ to ⅝ of an inch, depending upon the material of construction.

Figure 2:
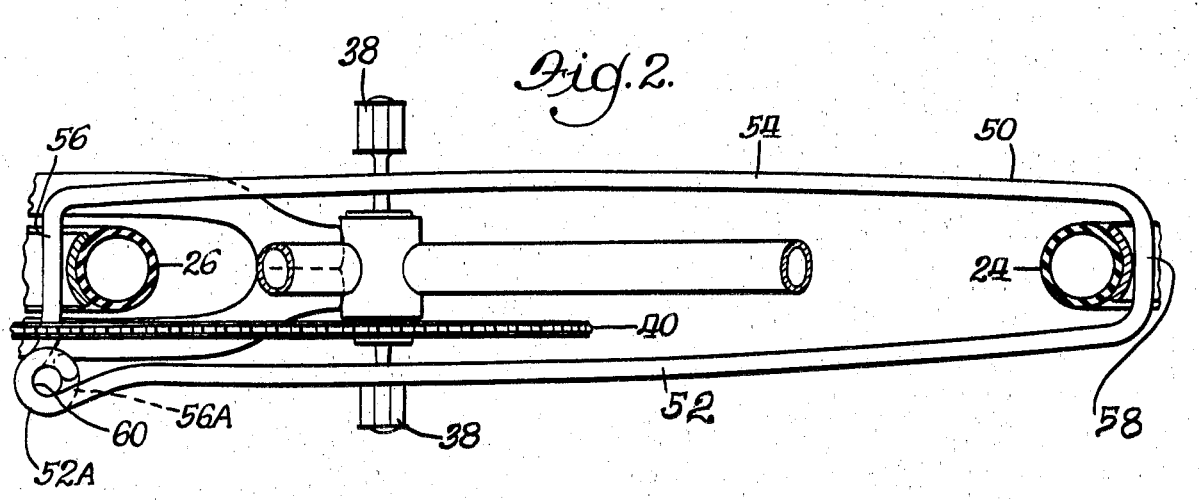

Referring to FIG. 2, there is shown the view of the bicycle of FIG. 1, as viewed from beneath the vehicle. The shackle 50 is in position securing the vehicle 20 against being driven away or otherwise having its wheels removed. As will be explained hereinafter, the shackle device may be used in conjunction with a supplemental short length of chain to secure it to a permanent fixture or post or otherwise to use the shackle in conjunction with a conventional bike rack construction so as to removably lock the bicycle to a permanent fixture as well as locking two wheels together with the driving mechanism of the bicycle.

The U shaped shackle 50 in FIG. 2, has a base section 58, which engages the inside rim of the front wheel 24. The legs 52 and 54 extent rearwardly encircling the lower fram 32, including the sprocket 40 and the chain 42. The leg member 54 has a cross arm 56, which terminates in a loop configuration 56A. The leg member 52 also terminates in a loop 52A. The loop 56A and 52A when in overlapping relation form a bypass type hasp having a common opening 60, through which may be passed the shackle portion of a padlock (not shown).

Giving consideration to the unique construction, it will be observed that the hasps 56A and 52A are in an overlying relationship to one another so that it becomes extremely difficult to pry open the loop 56A or the loop 52A once the opening 60 is taken up with the padlock 57. In this secured position both the front wheel 24 and the rear wheel 26 are locked in position on the frame and the vehicle is protected against the theft of the important parts.

Figure 3:
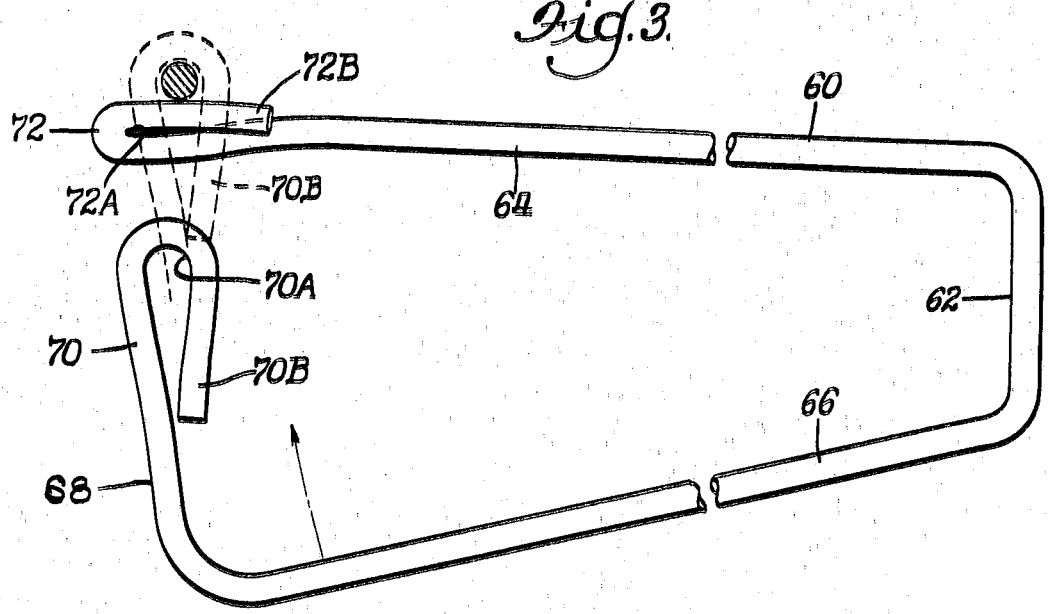

Referring to FIG. 3 there is shown another embodiment of the shackle construction of this invention identified generally with the reference numeral 60, which is similar to the shackle 50 shown in FIG. 2. The shackle 60 is formed of a hardened, resilient steel rod and shaped so as to provide a base portion 62 from which there extends rearwardly the leg portions 64 and 66. The hardened resilient steel construction tends to bias the leg portion in the opened or spread-apart condition, as shown in FIG. 3. The leg portions 64 and 66 are integral with the base 62. The leg member 66 has a cross arm 68, which terminates in a loop construction 70. The other leg 6 also terminates in a looped construction 72. The loop constructions are arranged so that they are matingly engaged when the leg members are pressed toward one another. To accomplish this, the loops 70 and 72 are formed so that their openings 70A and 72A, lie in planes perpendicular to one another. Opening 72A is made just large enough to receive the loop 70 in a manner that permits a sufficiently large segment of the loop to pass through the opening 72A, as shown in the dotten outline portion of FIG. 3. A conventional hasp or a padlock can be passed through the opening 70A.

It will be appreciated that the shackle 60 is as it would appear in its locked position in FIG. 2. The free end portions 70B and 72B of the loop 70 and 72, are positioned in such a manner so as to make the loop portion 70A and 72A inaccessible to a pry-bar in order to force apart the free ends 70B and 72B from their respective leg portions 64 and 66, and be pulled apart, so as to give up the padlock.

Referring now to FIGS. 4A and 4B, there is shown still another embodiment of female loop, formations 80A and 80B respectively, as part of the leg member 81 and the techniques for securing the free ends 82 thereof. Female loop formation 80A in FIG. 4A is formed with the free end 82, is folded along the underside of the leg portion 81, so that there is provided an additional length of material 84 along one side of the loop.

In FIG. 4B the free end 82 is secured to the leg 81 by welding along the segment 86, so as to completely integrate the free end portion 82 with the leg, forming a complete closure.

In summation, of the various types of closures which have been disclosed, the preferred hasp arrangement is the construction shown in 4B, which is completely resistant to the use of a pry-bar in the shackle construction of the instant invention.

One of the novel features of this invention is the combination of the shackle 50 and the bicycle 20, in which the latter, when in a non-operating condition or in a stored condition while the vehicle is not in use, is conveniently mounted on the upper frame portion 34 beneath the seat assembly 44, so that it is out of the way and in no way interferes with the operation of the bicycle.

Referring now to FIG. 5, there is shown the mounting construction for the shackle 50 in the stored or non-operating condition beneath the seat 45 on the upper frame portion 34. Affixed to the rear wheel fork 90 and cross bar 92 are retainer clips 94 and 96 of the "bayonet type" for receiving the extension 56 of the leg 54 and the base section 58 respectively of the shackle 50. It will be appreciated that the precise construction of the clips is not significant and a wide variety of retaining devices may be used. For example, such retaining devices may be used as airplane clips, pipe clamps, bicycle frame clamps, conduit pipe straps, a variety of heavy guage resilient rubber of plastic clips can be employed to equal advantage as the aforementioned bayonet clips. It will be seen that the shackle mounted as shown in FIG. 5 is securely held in position and is easily removed for simultaneously locking and securing together the wheels and the frame.

FIGS. 6A and 6B are presented to show the means for mounting the shackle in the non-operating condition on the upper frame section 98 on a bicycle that does not have the cross bar 92 shown in FIG. 5. A set of retainer clips 100 and 102, are fixed to the fender 104 and the main frame member 106 respectively. To mount the shackle 50 or 60 on the upper frame 98 the base 58 of the shackle is received in the clip 100 and the leg extension 56 is retained by the clip 102.

Another technique for mounting the shackle 50 on the upper frame 98 is shown in FIG. 6B. Clips 100 and 102 are mounted along one of the tines 110 of the rear wheel fork 112. The shackle 50 is secured by having one of the leg members 52 gripped by the clips 100 and 102, so it extends parallel to the tines beneath the seat 45, so that it is completely out of the way of the driver of the bicycle.

In the foregoing description various mountings for the shackles 50 and 60 have been described when the vehicle is in use, so that they are held securely to the upper frame in a manner that affords minimum interference with the operation of the vehicle and further, the amount of vibrational noise from the mounting is substantially reduced as compared to the heretofore known chain and link combinations for securing vehicles of this type.

The novel combination shackle and two-wheeled vehicle which has been described hereinabove in some detail, is deemed to provide greatly improved security for all types of bicycles and in particular the type of bicycles which are equipped with multiple gear speed controls. By having the two wheels completely encircled, together with the sprocket portion on the frame, significant protection is provided against the removal of either the front or rear wheel, through the use of prybar devices which would free up the locks or shackles of known constructions. A thief would be thwarted in his attempt to remove the front wheel by simply loosening the retaining nuts, which hold the front wheel to the front fork of the bicycle, or in the case of a racing bicycle by releasing the holding levers, known in the trade as "easy-offs."

In achieving the overall security of the vehicle against theft it is contemplated that it may be used with a chain and padlock for ultimately securing it to a permanent fixture in addition to the use of the shackle device. However, in the circumstance that a conventional bicycle rack is to be used to serve as the support for the front wheel, it is contemplated that such racks would be equipped with a holding member or a retainer, capable of receiving one of the legs of the shackle. For example, such a suitable retainer would be a grommet or eye-hook type retainer, welded to the rack so that either leg of the shackle could be received through the opening, while at the same time encircling both wheels as well as the main portion of the frame so as to present a completely secure system, obviating the need for any supplemental chains when securing the bicycle to this type of fixture.

What is claimed is:

1. In a locking arrangement for a two-wheeled vehicle the combination comprising a frame support structure, two wheels rotatably mounted in said frame structure, a securing device comprising a rigid elongated, generally U shaped shackle, having free ended leg portions, resiliently biased toward an open condition, said free ends of said leg portions being equipped with closure means for securing said free ends thereof in a closed condition, means on said frame for positioning said shackle in a first secured condition for securing the vehicle against movement and locking the wheels thereof within said frame when the vehicle is not in operation and a second stored condition, when said shackle is not in use, said leg portions being of sufficient length to extend between and encircle said wheels when in said first secured condition secured to the lower portion of said frame and in said stored condition being mounted on the upper portion of said frame.

2. The combination as set forth in claim 1, wherein said closure means comprises matingly engageable hasps which in their closed condition are adapted to receive locking means for securing said leg portions in said closed position.

3. The combination as claimed in claim 1, wherein said closure means comprises matingly engageable hasps which are adpated to overlie one another, forming a common passage therethrough for receiving a locking device.

4. The combination as claimed in claim 1, wherein said means on said frame for positioning said shackle in said second stored condition is located on the upper portion of said frame, beneath the seat support construction for the driver of said vehicle.

5. The combination as claimed in claim 2, wherein said closure means comprise a female and male member which in the closed position exposes a passageway through said male element, through which is received a locking device.

6. The combination as claimed in claim 1, wherein a two-wheeled vehicle is a manually driven cycle, equipped with a seating device at the upper portion of said frame and said means on said upper frame for positioning said shackle in said stored condition comprises clip means located adjacent said seating device, for securely engaging said hasps whereby said shackle is positioned beneath said seating device on said frame.

7. In a two-wheeled vehicle, including means for securing the vehicle to prevent theft of the components thereof the combination comprising a lower main frame support structure, and upper main frame support structure including thereon a seating assembly, two wheels adapted to be rotatably received in said frame structure, a securing device comprising a continuous rigid elongated, generally U shaped shackle, having free ended leg portions, resiliently biased toward an open condition, said free ends of said leg portions terminating in a first and second loop configuration, said second loop configuration being of a larger circular area so as to receive therethrough the first loop formation, said first loop formation protruding and clearing said second loop formation so as to expose a portion thereof permitting the passage therethrough of a locking device, means on said frame for positioning said shackle in a first secured condition for securing the vehicle against the removal of any parts therefrom and a second stored condition when said vehicle is in operation, said leg portions being of sufficient length to extend between and encircle the wheels of said vehicle when in said first secired condition so that the wheels are retained locked on the frame, clip means on the upper frame portion for removably receiving one leg of said shackle when in said second stored condition adjacent the seat assembly and remote from the lower frame support structure.

8. The combination as claimed in claim 7 wherein the free ends of said loop formations are welded to form a continuous integral closure on each of said leg members.

* * * * *